July 7, 1964      C. N. KELBER      3,140,236
NUCLEAR REACTOR WITH IMPROVED BEAM TUBE
Filed Dec. 26, 1962
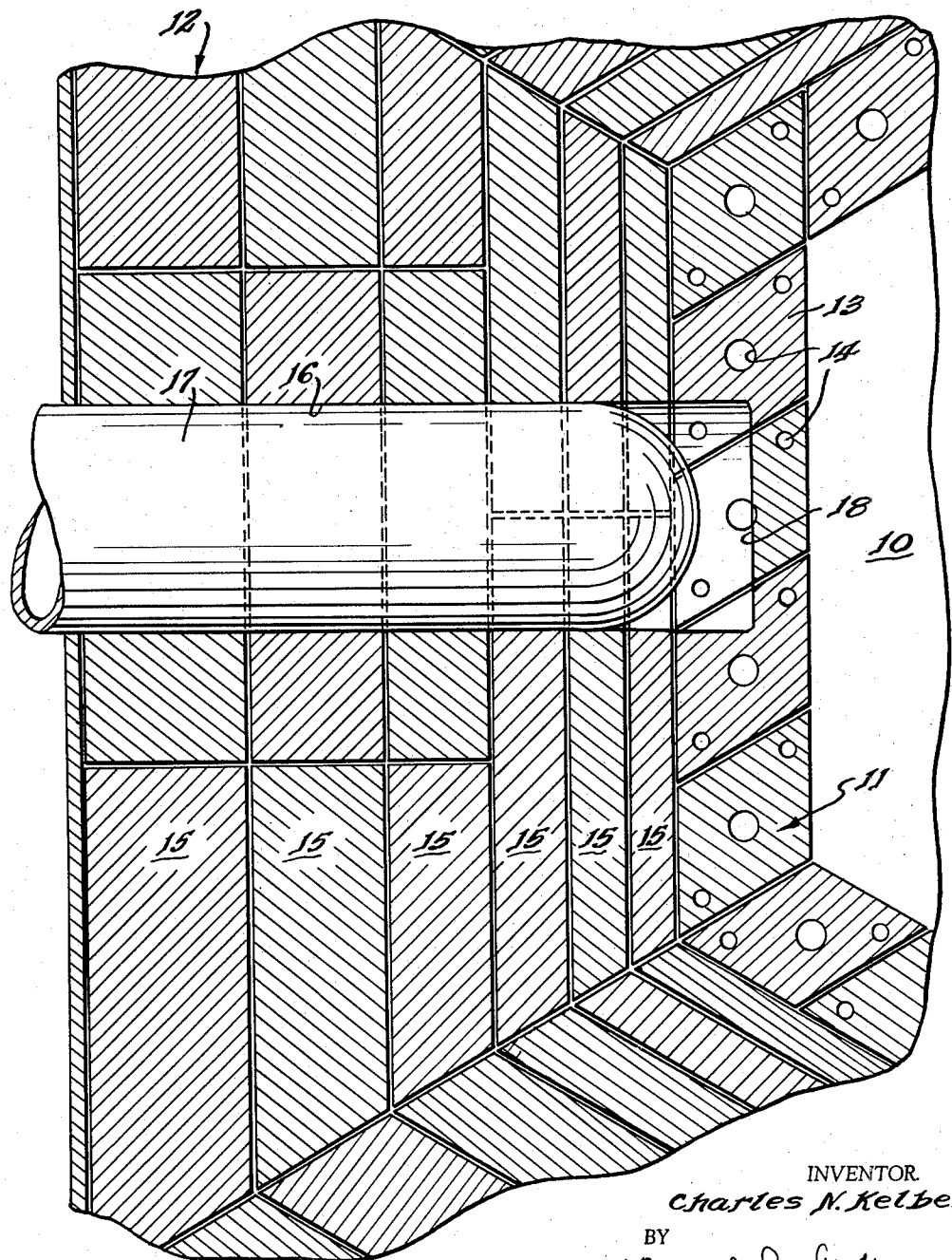
INVENTOR.
Charles N. Kelber
BY
Roland A. Anderson
Attorney

United States Patent Office 3,140,236
Patented July 7, 1964

3,140,236
NUCLEAR REACTOR WITH IMPROVED BEAM TUBE
Charles N. Kelber, Wheaton, Ill., assignor to the United States of America as represented by the United States Atomic Energy Commission
Filed Dec. 26, 1962, Ser. No. 247,416
3 Claims. (Cl. 176—18)

This invention relates to an improvement in experimental facilities in a research nuclear reactor. In more detail the invention relates to means for increasing the thermal flux available for experimental purposes in the reflector of a heterogeneous, water-cooled and -moderated, beryllium-reflected nuclear reactor.

The invention will be described particularly as applied to the Argonne Advanced Research Reactor which is described in detail in patent application S.N. 247,418, filed concurrently herewith in the names of Goldstein et al. That application includes a discussion of the necessity for and advantages arising from a very high thermal flux in an experimental facility called an internal thermal column at the center of the core. Obviously, it is also desirable to provide a very high thermal flux at other experimental locations in the reactor. This is particularly true of the horizontal beam tubes in the reflector since a large share of the experimental work done in the reactor will be accomplished in these beam tubes.

It is accordingly an object of the present invention to produce a local peak of thermal neutron flux in the reflector of a nuclear reactor.

It is a more specific object of the present invention to increase the thermal neutron flux available in horizontal beam tubes located in the reflector of a heterogeneous, water-cooled and -moderated, beryllium-reflected nuclear reactor.

These and other objects of the present invention are attained by substituting a small amount of light water for beryllium in the reflector of a beryllium-reflected nuclear reactor at the locations an increased thermal neutron flux is desired. Water is substituted for beryllium adjacent the end of each beam tube in which an increased neutron flux is desired to provide a layer of water and a layer of beryllium between the end of the beam tube and the reactor core. Proper coordination of the relative thickness of the beryllium and the water layers provides a dramatic increase in the thermal flux available in the horizontal beam tubes at the expense of only a minor loss in reactivity.

The invention will next be described in connection with the accompanying drawing which represents a fragmentary horizontal cross-sectional view of a nuclear reactor illustrating the present invention.

The reactor comprises a core, which may be identical to the reactor core disclosed in the above-identified application, disposed in hexagonal opening 10 in a reflector comprising an inner region 11 and an outer region 12. Inner reflector region 11 consists of a hexagonal row of rhomboidal beryllium pieces 13 which are each penetrated by several longitudinal holes 14 through which cooling water passes. Outer reflector region 12 is composed of a number of spaced beryllium slabs 15 of varying thickness, cooling water passing between the slabs, and a channel 16 containing a cylindrical beam tube 17 which extends entirely through outer reflector region 12.

According to the present invention, a recess 18 communicating with some of the longitudinal holes 14 is provided in inner reflector region 11 forming an extension of channel 16 in outer reflector region 12. As shown, the end of the cylindrical beam tube 17 is convex in shape and extends into recess 18. Since recess 18 communicates with holes 14, recess 18 is filled with light water which constitutes a light water layer adjacent the end of beam tube 17. Thus a layer of water and a layer of beryllium separate the end of beam tube 17 from the reactor core.

The thickness of the beryllium layer and the thickness of the water layer must be carefully correlated to obtain the benefits of the present invention. Since light water is a good slowing down medium but is also a relatively high absorber of neutrons, an increase in the thickness of the water layer over the optimum results in net loss in thermal neutrons due to absorption of neutrons and therefore a reduction in thermal flux. On the other hand, a reduction in the thickness of the water layer from the optimum also results in a reduction in thermal flux because beryllium is a poorer slowing down medium than is light water.

The beryllium layer must be located next to the core of the reactor and the water layer must be located next to the beam tube. The water layer is located next to the beam tube so that neutrons are thermalized close to the point where they are to be utilized and the beryllium layer is located next to the core to make use of the superior moderating ability of beryllium for fission neutrons. Fission neutrons originating in the core are moderated by the beryllium to an energy in the 0.1 to 1.0 mev. range and then are moderated to thermal energy by light water. Light water is particularly effective as a moderator on neutrons in the energy range of 0.1 to 1.0 mev. or lower.

As has been stated, the thickness of the layer of water and of the layer of beryllium is important. The thickness of the water layer is less than the root mean square migration area of fission neutrons in water since the neutrons reaching the water layer have already been partially slowed in the beryllium layer. However, the thickness of the water layer must be sufficiently great to moderate substantially all the neutrons to thermal energy. The thickness of the beryllium layer need only be great enough to moderate most of the fission neutrons to 0.1 to 1.0 mev. since the moderating efficiency of light water is uniformly high for neutrons with energies in this range or lower. The thickness of the beryllium layer should not be so great as to lower the fast flux level by geometric attenuation which would reduce the source strength for thermal neutrons. Since the migration area of the partially slowed neutrons in water is small, there is little difference in the optimum thickness of the water layer with differences in the thickness of the beryllium layer. Thus an increase in the thickness of the beryllium layer would not result in a decrease in the thickness of the water layer.

In the specific reactor disclosed in the above-identified copending application, the optimum thickness of the beryllium layer is about 2.5 cm. and that of the water layer is about 4 to 4.5 cm. Layers of beryllium and water of about the same thickness could be used in other similar reactors of about the same size—within about 25% of the size of the described reactor—with comparatively little decrease in the effectiveness of the arrangement.

It will be noted that the water layer does not constitute a flux trap as it is usually defined since a flux trap is surrounded on all sides by fuel. In the present case all neutrons originate in the core, pass originally through the beryllium layer, and then through the water layer before they reach the beam tube.

With a layer of beryllium 2.5 cm. thick and a water layer 4.5 cm. thick between the beam tubes and the core, a thermal neutron flux of $10^{15}$ n/cm.$^2$-sec. is attainable in the beam tubes of the reactor described in the above-identified application at a reactor power of 100 mw. As shown in that application, the maximum flux attainable in the beam tubes without the water layer is $7.2 \times 10^{14}$ n/cm.$^2$-sec. Thus the flux in the beam tubes is increased about 30% through the present invention. This increase in flux is obtained at a reactivity loss of only about ¾%.

While the invention has been described as applied to a specific reactor, it is equally applicable to other similar reactors. Also any other hydrogeneous material of relatively high hydrogen content and low absorption cross-section could be employed in place of light water.

It will be understood that the invention is not to be limited to the details given herein but that it may be modified within the scope of the appended claims.

What is claimed is:

1. In a nuclear reactor comprising a core, a beryllium reflector surrounding the core, and a horizontal beam tube penetrating the reflector, the combination therewith of a layer of light water immediately adjacent the tip of the beam tube, said layer of water being separated from the core by a layer of beryllium.

2. In a nuclear reactor comprising a core, a reflector consisting of an inner and an outer region surrounding the core, said outer region containing at least one channel extending therethrough, a cylindrical beam tube in said channel, said inner region consisting of a hexagonal row of rhomboidal beryllium pieces having holes extending longitudinally therethrough, through which light water passes, the improvement comprising a recess communicating with some of said longitudinal holes in said inner region of the reflector forming an extension of the channel in the outer portion of the reflector, the end of the cylindrical beam tube being convex in shape and extending into said recess, whereby the recess is filled with light water which forms a layer adjacent the end of the beam tube.

3. The improvement according to claim 2 wherein the beryllium layer is 2.5 cm. thick and the water layer is 4.5 cm. thick.

References Cited in the file of this patent

UNITED STATES PATENTS

| | | |
|---|---|---|
| 2,831,806 | Wigner | Apr. 22, 1958 |
| 2,919,236 | Zinn | Dec. 29, 1959 |

OTHER REFERENCES

Second International Conference on Peaceful Uses of Atomic Energy, volume 10, 1958, Goncharov et al. (Paper No. 2185), pages 353 and 354.